No. 625,230. Patented May 16, 1899.
J. R. WIONT.
BOLT.
(Application filed Feb. 11, 1899.)
(No Model.)
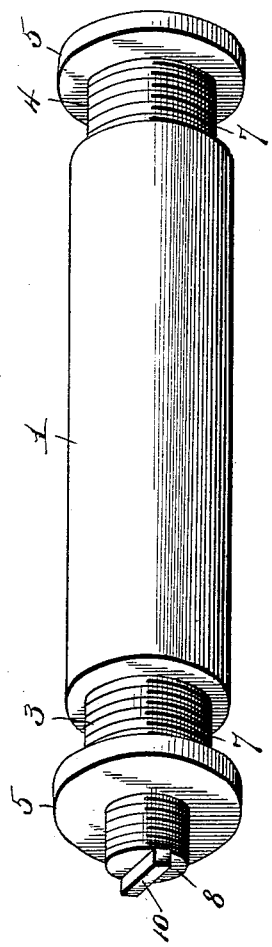
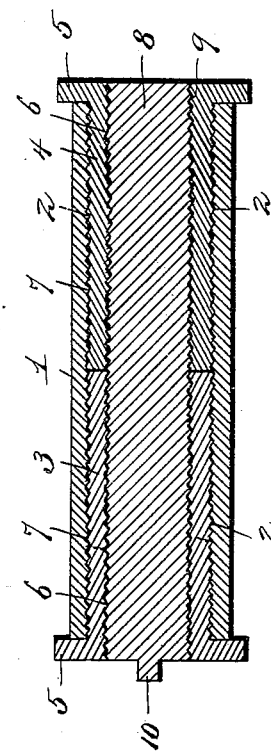
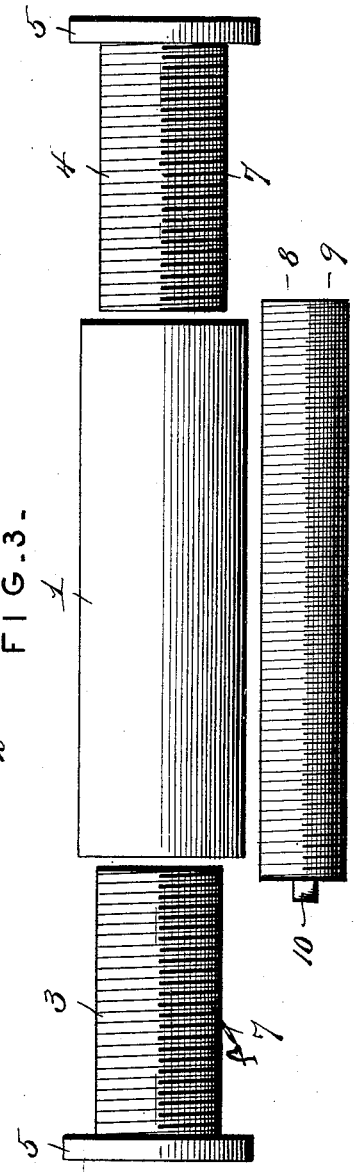
Witnesses
Harry L. Ames.
K. C. Nau.
Inventor
Jesse R. Wiont.
By V. D. Stockbridge
Attorney

UNITED STATES PATENT OFFICE.

JESSE R. WIONT, OF STOCKWELL, INDIANA.

BOLT.

SPECIFICATION forming part of Letters Patent No. 625,230, dated May 16, 1899.

Application filed February 11, 1899. Serial No. 705,292. (No model.)

*To all whom it may concern:*

Be it known that I, JESSE R. WIONT, a citizen of the United States, residing at Stockwell, in the county of Tippecanoe and State of Indiana, have invented certain new and useful Improvements in Bolts; and I do hereby declare the following to be a full, clear, and exact description of the invention, such as will enable others skilled in the art to which it appertains to make and use the same.

This invention relates to a novel lock-bolt, and has for its object the production of a simple and efficient bolt which may be readily applied and locked securely in place.

To the accomplishment of this object the invention consists in forming the bolt from three telescopic cylindrical sections designed to be screwed one into the other and to be locked securely in place by what may be termed a "locking-pin."

Referring to the drawings, Figure 1 is a perspective view of my bolt complete, and Fig. 2 is a central longitudinal section therethrough. Fig. 3 shows in side elevation the different parts of my bolt dissembled.

Referring to the numerals on the drawings, 1 indicates the bolt proper, which consists of a metal cylinder of any desired length provided with internal screw-threads 2.

3 and 4 indicate detachable end sections provided with terminal heads or annular flanges 5 and with internal and external screw-threads 6 and 7.

The end sections 3 and 4 are designed to be screwed into the cylinder 1 from the opposite ends until the heads 5 abut against said cylinder. The several sections are now locked in place by screwing the solid locking-pin 8, provided with external screw-threads 9, into the end sections, as indicated in Fig. 2 of the drawings, the locking-bolt being of sufficient length to engage both end sections and being preferably provided with a squared terminal lug 10, by means of which it may be screwed into place. The external threads on the pin 8 and the internal threads in the end sections 3 and 4 are preferably finer than the threads on the exterior of said sections 3 and 4. By making the threads of different pitch, as above indicated, the parts are locked in position and prevented from becoming accidentally displaced and disengaged.

It will be obvious from the foregoing that in order to secure the bolt without the necessity for the employment of nuts, nut-locking devices, and the like it is simply necessary to pass the cylinder 1 through the bolt-aperture, insert the sections 3 and 4 in the opposite ends of the cylinder, and lastly screw the pin 8 through the end sections into the bolt or cylinder, and finally lock the several sections by the introduction of the solid locking-pin; but while the foregoing is an accurate description of the preferred embodiment of my invention I do not desire to limit myself to the construction in detail set out, but reserve the right to change my structure at will within the scope of my invention.

What I claim is—

1. In a lock-bolt, the combination with a hollow cylinder provided with internal screw-threads, of internally and externally threaded end sections designed to screw into the cylinder, and having heads of greater diameter than the cylinder, and means for locking said end sections in place, substantially as specified.

2. In a lock-bolt, the combination with a hollow cylinder provided with internal screw-threads, of hollow cylindrical end sections provided with internal and external screw-threads and with terminal heads of greater diameter than the cylinder, and a solid threaded locking-pin designed to engage the internal screw-threads in the end sections, substantially as described.

3. In a lock-bolt, the combination with a hollow cylinder provided with internal screw-threads, of hollow cylindrical end sections designed to screw into the cylinder and provided with internal and external screw-threads and with terminal heads of greater diameter than the cylinder, and an externally-screw-threaded locking-pin designed to screw into the end sections and provided with a terminal lug, substantially as specified.

In testimony whereof I affix my signature in presence of two witnesses.

JESSE R. WIONT.

Witnesses:
EATHAN HOOVER,
JOHN A. MILLER.